April 16, 1963 W. L. GASKELL 3,085,602
TILTING ARBOR SAW
Original Filed June 14, 1954 6 Sheets-Sheet 5
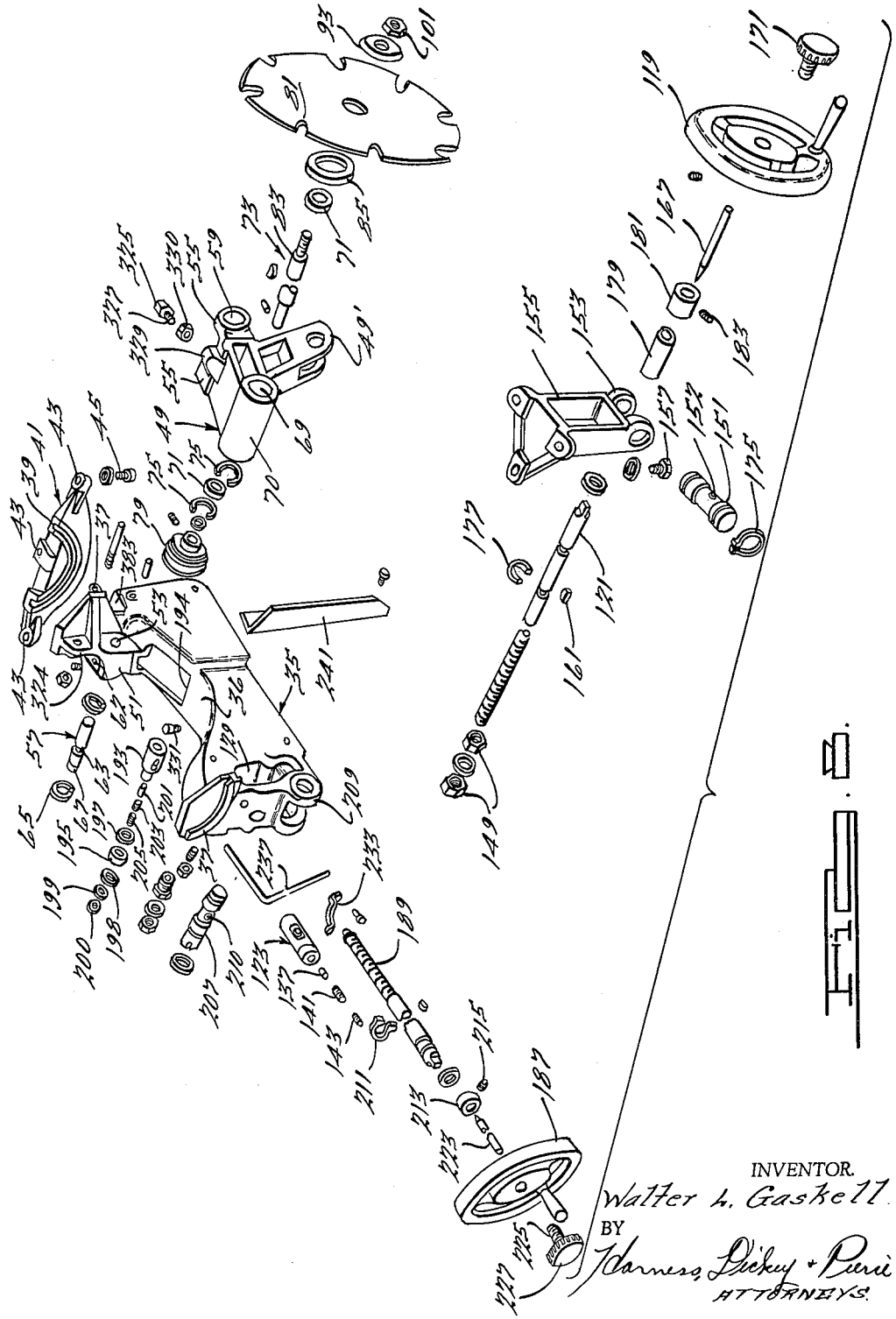
INVENTOR.
Walter L. Gaskell.
BY
Harness, Dickey + Pierce
ATTORNEYS.

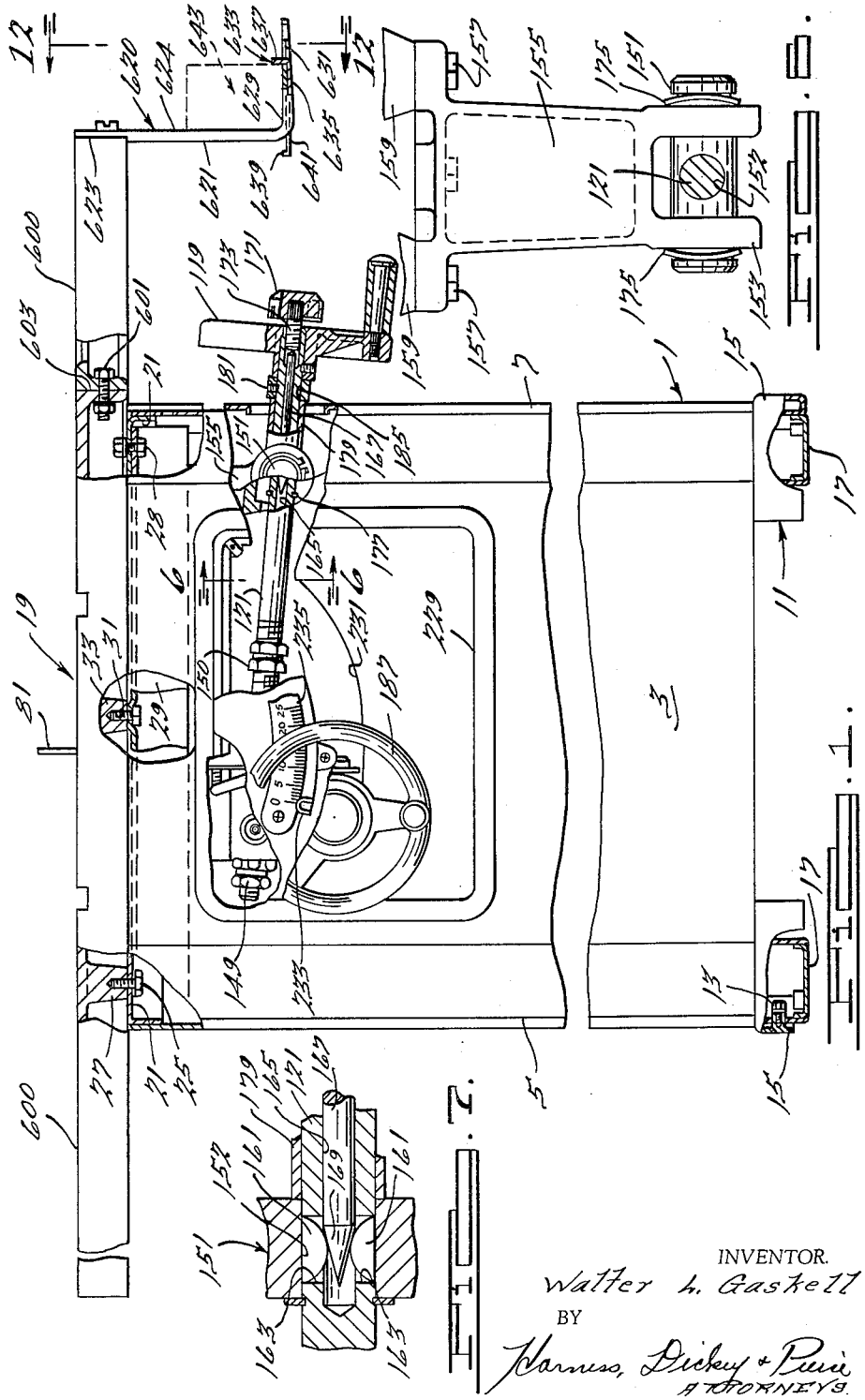

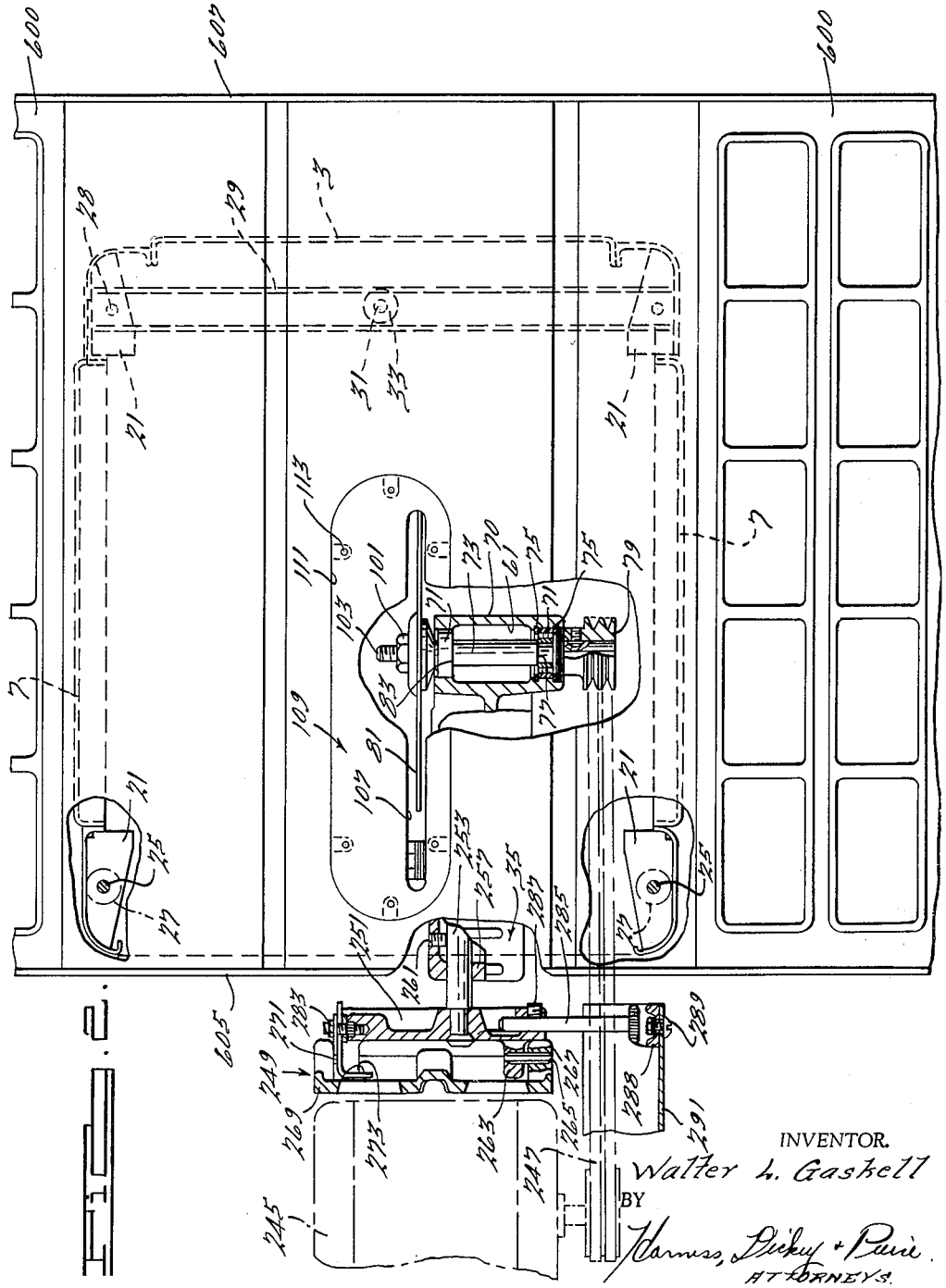

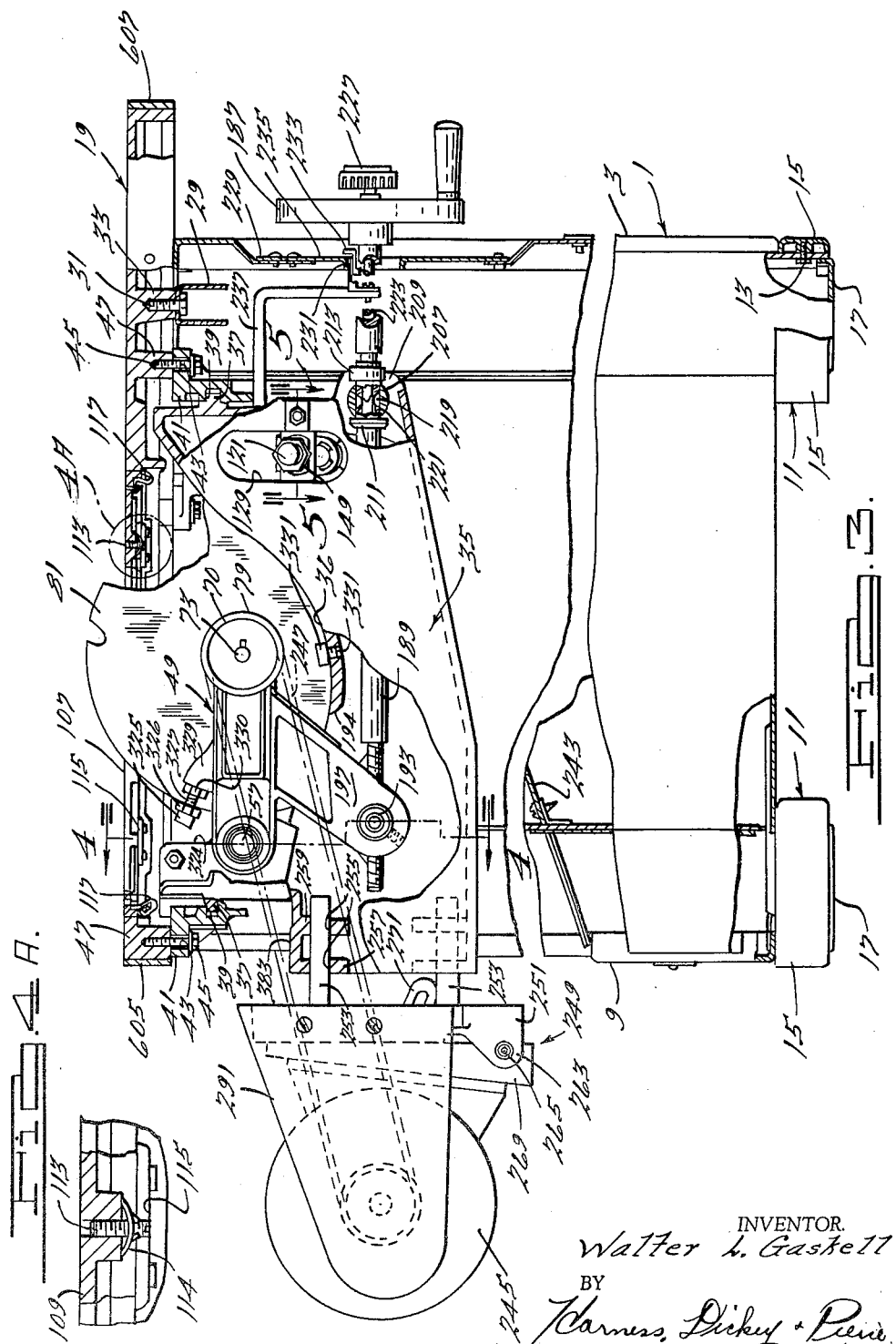

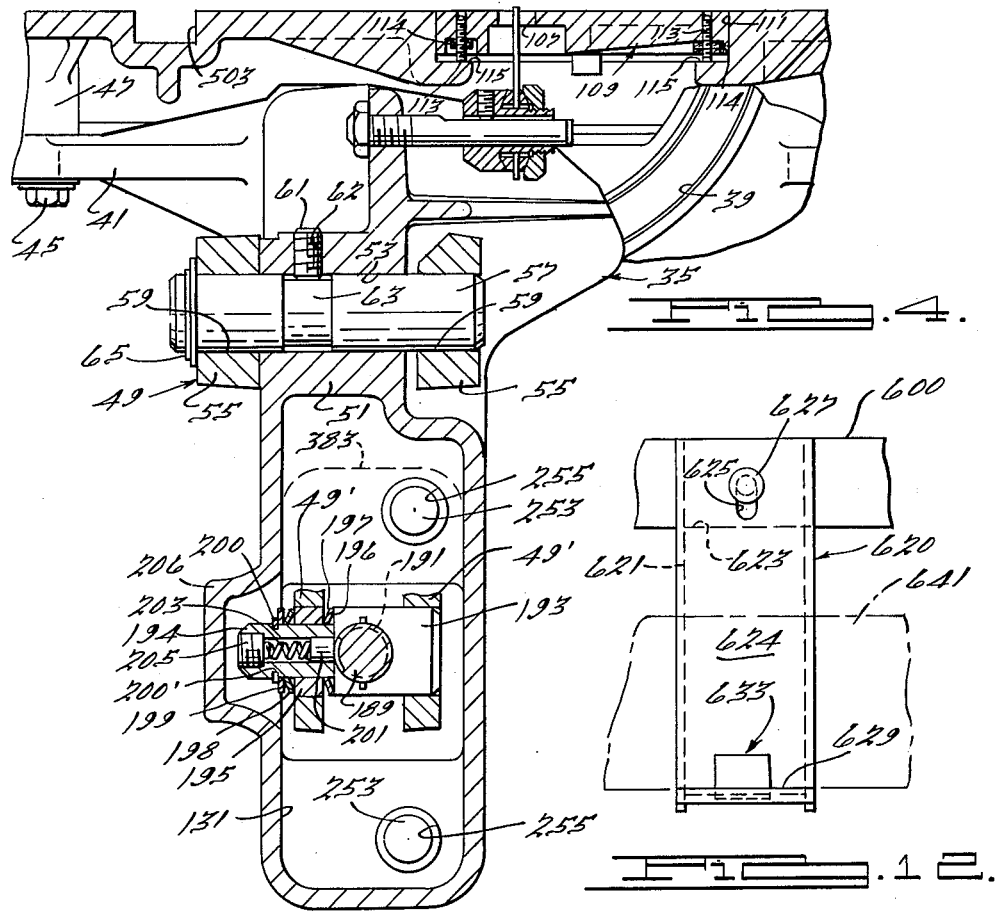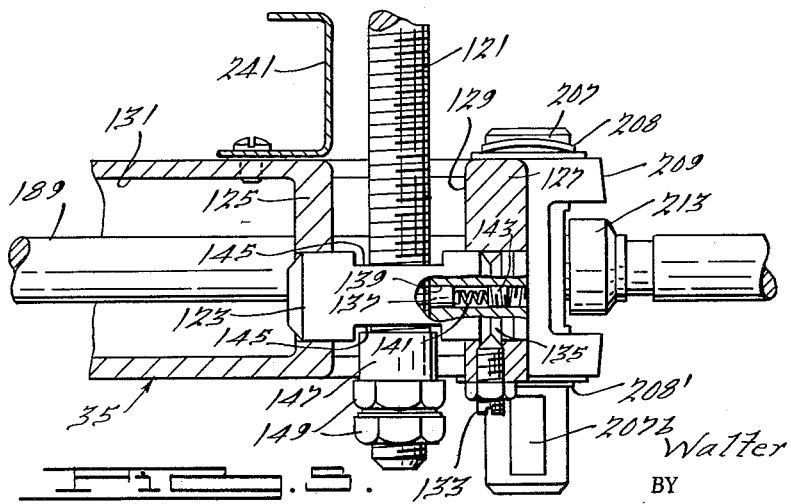

April 16, 1963     W. L. GASKELL     3,085,602
TILTING ARBOR SAW
Original Filed June 14, 1954     6 Sheets-Sheet 6
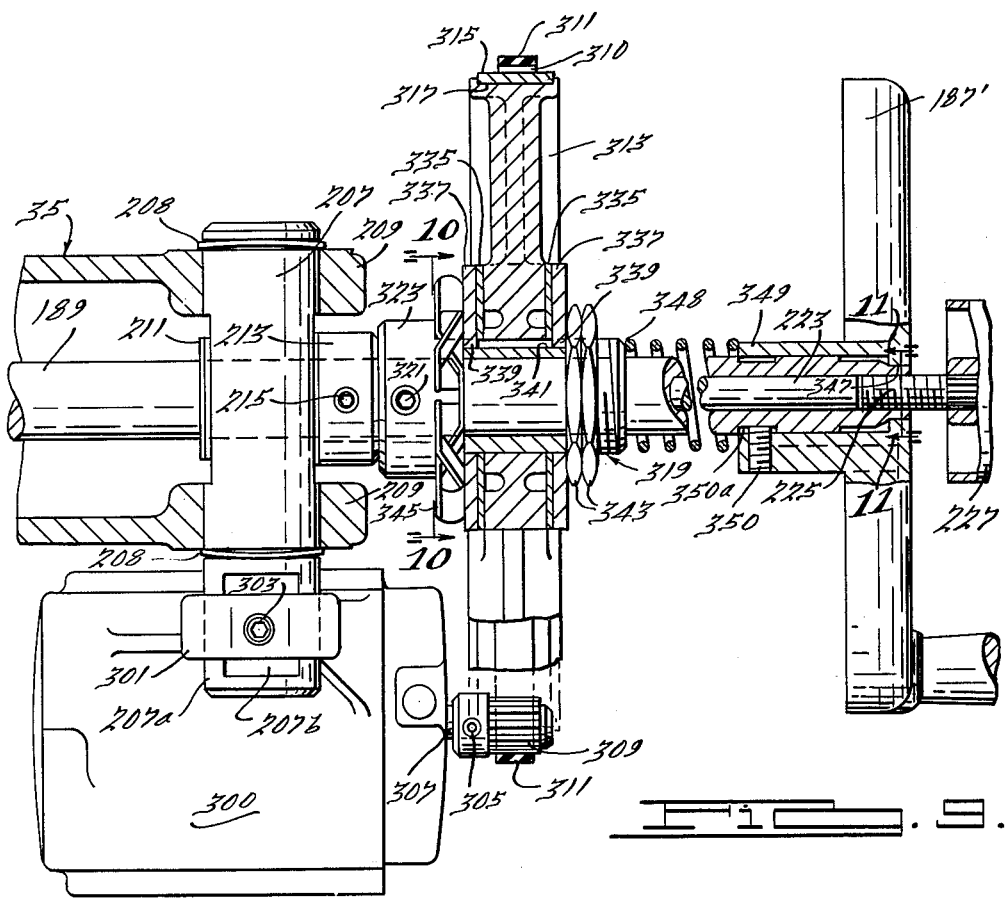
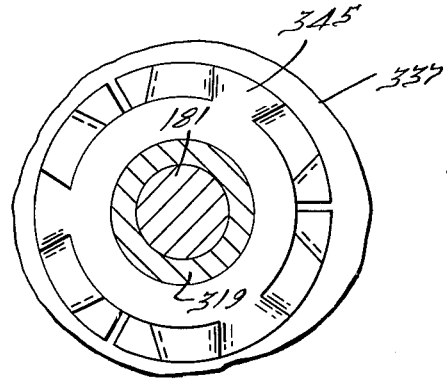
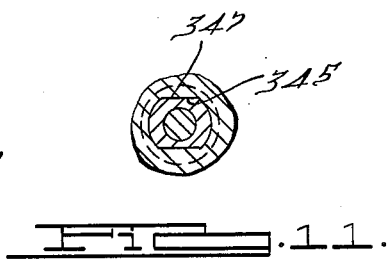
INVENTOR.
Walter L. Gaskell
BY
Harness, Dickey & Pierce
ATTORNEYS.

United States Patent Office 3,085,602
Patented Apr. 16, 1963

3,085,602
TILTING ARBOR SAW
Walter L. Gaskell, Ypsilanti, Mich., assignor to King-Seeley Thermos Co., a corporation of Michigan
Original application June 14, 1954, Ser. No. 436,450, now Patent No. 2,873,773, dated Feb. 17, 1959. Divided and this application May 13, 1958, Ser. No. 734,993
4 Claims. (Cl. 143—36)

This invention relates to tilting arbor saws of the type commonly used in home workshops in working with wood. This application is based on my co-pending application, Serial No. 436,450, filed June 14, 1954, issued February 17, 1959, as Patent No. 2,873,773 and is a division thereof.

In recent years there has been a very significant increase in interest in "Do-it-yourself" activities and one very popular field has been in making articles of wood. Inasmuch as this is ordinarily in the nature of a hobby, most people are not able to spend substantial sums of money to buy professional woodworking equipment and a special industry has grown up to supply rather low-priced tools for the home workshop. In order to achieve a low cost it was necessary to introduce mass production techniques into this industry and to modify the professional machine designs in such a way that they could be handled by mass production methods. This includes the simplification of parts and assemblies and elimination of unnecessary material, a process which, if carried too far, results in a tool that is too flimsy, one which is difficult to use, or one which turns out poor work.

It is the object of this invention to provide a woodworking arbor saw to meet the needs of the home workshop in that it can be produced and sold at a relatively low price but which surpasses previously known saws in its price field by being constructed to do a fully professional job of wood cutting. The low cost of manufacture is obtained in the present saw by various design features that make it possible to produce the component parts of the saw on a mass basis and then assemble them with a minimum of labor. In addition, the saw includes a number of design features that make it possible to accurately adjust the saw after final assembly so that it will be completely accurate and run true, thus reducing the dimensional tolerances which must be held on and among the various parts during the course of production. The improved saw also includes features of design which make it very strong and sturdy and not subject to distortion under load or when bolted in place on a floor. Improved features are also incorporated in the operating mechanism whereby the arbor is elevated and tilted and includes means for driving by a motor either or both the tilting and elevating mechanism.

The invention also provides improvements in the motor mount, the miter gage, the anti-kickback fingers, the splitter and saw guard construction, and a means for stowing certain accessories that are not being used, such as a fence.

A preferred embodiment of the invention is shown by way of illustration in the accompanying drawings in which:

FIGURE 1 is a front elevation of a tilting arbor wood saw embodying the invention and having parts in section and parts broken away;

FIG. 2 is a plan view of the saw with parts in section and parts broken away;

FIG. 3 is a side elevation of the left of the saw with parts broken away and parts in section;

FIG. 4 is a section along line 4—4 of FIG. 3 through the connections between the frame, the arbor arm, the elevating screw, and the splitter blade mounting and also showing the jackscrew mountings for the table insert;

FIG. 4a (Sheet 3) is an enlarged fragmentary view of the jackscrew mounting;

FIG. 5 is a section along line 5—5 of FIG. 3 showing the connection of the tilt screw to the frame;

FIG. 6 (Sheet 1) is a side elevation of the bracket for supporting the tilt screw;

FIG. 7 is an enlarged sectional view of the locking connection between the tilt screw and the swivel in the bracket of FIG. 6;

FIG. 8 is an exploded view of most of the parts of the operating mechanism;

FIG. 9 is a fragmentary sectional view of the connection between the elevating screw and the front end of the frame and includes mechanism whereby the elevating screw may be either motor driven or manually operated;

FIG. 10 is an enlarged section along line 10—10 of FIG. 9 and shows the wave type spring washer, a member that is available on the open market;

FIG. 11 is a section along line 11—11 of FIG. 9 showing the square drive connection between handwheel and elevating screw to provide for manual rotation;

FIG. 12 (Sheet 4) is a detail view of the fence bar hanger as seen on line 12—12 of FIGURE 1.

As seen in FIGS. 1 and 3, the tilting arbor circular wood saw of this invention includes a sheet metal floor cabinet 1 that has a front side 3, a left side 5, a right side 7, and a back 9. The cabinet is provided with feet 11 at the four corners and around the outside of each is attached by bolts 13 a right angle die-cast buffer piece 15. Across the bottom of each foot is a rigid plate 17 that rests on the floor and which is provided with one or more holes (not shown) to receive bolts (not shown) for bolting the cabinet 1 to the floor.

The top of the cabinet 1 is open but covered by the heavy cast iron table plate 19 which is bolted at only three points to the cabinet. In order to provide these three points of attachment, the two rear top corners of the cabinet are provided with rigid brackets 21 having bolt holes through which bolts 25 extend upwardly to thread into lugs 27 cast on the bottom of the table 19. The two front corners of the cabinet are also provided with rigid brackets 21 and bolted to the underside thereof by bolts 28 is a downwardly presenting channel 29 (FIGS. 1–3) extending across the front of the cabinet. At about the center of the channel, there is provided a hole for bolt 31 which extends upwardly to thread into a lug 33 on the bottom of the table 19. The three bolts 25 and 31 thus rigidly secure the table to the cabinet at three points. This arrangement makes it possible to bolt the feet 11 of the cabinet 1 to the floor without necessarily transmitting distortions in the cabinet to the table top, as the latter can be independently adjusted about its three points of support on the top of the cabinet.

The table plate 19 carries all of the operating mechanism for the saw, and no part of such mechanism has any direct connection with the cabinet. In other words, all load and forces from the operating mechanism pass first through the table 19 and then through the cabinet 1. By virtue of its size and location, the central part of the operating mechanism is the frame 35 which is mounted at each end on the underside of the table 19 so that it will tilt or swing through an arc of about 45 degrees about an axis lying on the top surface of the table and running perpendicular to the front edge of the table. The frame 35 (see FIG. 8) is a hollow closed metal casting that is bellied down at 36 in the midsection to accommodate vertical movement relative thereto of the saw arbor. Adjacent the tops of the front and rear faces of the frame 35 are curved shoes 37 (FIGS. 8 and 3) that fit in similarly curved recesses or ways 39 (FIGS. 8, 3, and 4) in front and rear table carried trunnions 41, the trunnions 41 having three oversize bolt holes 43 to receive bolts 45 whereby they are rigidly secured to lugs 47 on the bottom of the table 19, the oversize permitting some shifting at assembly to correct misalignment and accommodate manufacturing tolerances. The shoes 37 slide in ways 39 to provide the tilting movement referred to above.

The arbor arm 49 (FIGS. 2, 3, 4, and 8) is hinged on the frame 35 for movement up and down relative to the frame. The frame 35 has a boss 51 cast thereon adjacent the rear end with a transverse bore 53 therein. The arbor arm 49 is bifurcated with the spaced leg portions 55 (FIG. 4) thereof fitting on opposite sides of the boss 51. The arbor arm pivot pin 57 extends through the bore 53 and into holes 59 in the arm to pivotally support it on the frame 35. A set screw 61 in hole 62 of the frame 35 engages a reduced diameter portion 63 of the pin 57 to control axial movement thereof. The pin may also be axially positioned by a split, snap-on retaining ring 65 engaged in a groove 67 at the end of the pin 57.

The arbor arm 49 has a transverse bore 69 in the boss 70 at its forward end that contains spaced ball bearing sets 71 that rotatably support the arbor 73, snap rings 75 fitting in suitable grooves on opposite sides of a set 71 to take thrust on the set from arbor shoulder 77. The arbor 73 protrudes from opposite sides of the arm 49 and on its left end (as viewed from the front of the cabinet) a pulley sheave 79 (FIG. 2) is keyed to furnish means for rotating the arbor. The circular saw blade 81 is clamped on the right end of the arbor 73 against shoulder 83, it being noted that this particular unit is intended particularly for a 10" diameter blade though, of course, the design is not so limited.

The blade 81 is closely adjacent the right side face of the frame 35 and projects up through a saw slot 107 in the die cast table insert 109 that fits in the arbor nut access opening 111. The insert has leveling or jack screws 113 (FIGS. 4 and 4a) which bear upon pairs of pads 115 on opposite sides of the opening 111 that are cast on the bottom of table 19. The screws 113 extend through threaded holes and are tensioned by extending each through a speed nut 114 one size smaller than is meant for that size screw and can be threadably adjusted in the speed nuts to make insert 109 flush with the table top. Spring clips 117 may be secured to the insert to engage the ends of the opening 111 to yieldably hold the insert in position.

The blade 81 is tilted about an axis in and lengthwise of slot 107 by a handwheel 119 (FIG. 1) that is located outside the cabinet 1 on the right hand side thereof. The wheel hub is removably mounted on the end of the tilt screw 121 by means of a non-circular socket or the equivalent so that rotation of the handwheel rotates the screw. The inside or opposite end of the screw 121 (FIG. 5) is threaded diametrically through a pivot pin 123 which is pivotally supported in the walls 125 and 127 of an opening 129 through the frame 35, it being observed that the opening 129 does not open into the hollow interior 131 of the frame 35. The pin 123 is held in axial position by a radial dog screw 133 threaded in wall 127 and having its conical end riding in V groove 135 cut in the periphery of the pin, unloosening of the screw allowing some axial play of the pin to accommodate eccentricities in the screw 121. Play of the screw 121 is removed by a plug 137 of soft but tough non-metallic material such as nylon which rides in an axial opening 139 in the pin 123 and is pressed by spring 141 against the thread of the screw 121 to in turn press it against the internal thread (not shown) through swivel pin 123 which is engaged by the screw, the spring being confined under compression in bore 139 by set screw 143 threaded into the end of the pin 123. The portions of the pin 123 through which the screw 121 extends are machined off square as shown at 145 and the outside face is engaged at zero tilt position by the square end of collar 147 adjacent nuts 149 on the inside end of screw 121. The nuts 149 along with nuts 150 may be used to furnish stops limiting tilting movement.

In addition to the support furnished by pin 123, the screw 121 is supported by a swivel pin 151 (FIGS. 1, 6 and 7) through the bore 152 of which an unthreaded portion of the screw extends transversely of the axis of the pin, the pin 151 being journaled in the bifurcated bottom 153 of a bracket 155. The bracket 155 is rigidly secured by bolts 157 to lugs 159 on the bottom of the table 19, preferably at three points. The frame 35 and the bracket 155 thus furnish all of the support for the screw 121 and since they are directly connected to the table 19 distortion of the cabinet 1 will not affect operation of the screw.

Locking of the screw 121 in a position of desired tilt angle is accomplished by a pair of diametrically opposite semicircular Woodruff keys 161 (FIG. 7) that fit in key slots 163 in the screw 121. The straight edges of the keys are adjacent the wall of bore 152 in pin 151 and the curved edges are disposed inside of an aperture 165 extending from the outside end of the screw 121. A lock rod 167 slidable in aperture 165 has a pointed end surface 169 formed therein so that when the rod is pushed inwardly the keys 161 will ride up the surface 169 and jam against the wall of bore 152 to lock the screw against rotation in the bore, thus fixing the tilted position of the saw blade. The rod 167 is moved inwardly to achieve this result by a lock knob 171 (FIG. 1) that has a stem 173 threaded into the end of screw 121 to abut the end of rod 167. When the knob 171 is unscrewed, the rod 167 will become loose in aperture 165 allowing the keys 161 to move radially inwardly and unlock the screw 121, the depth of slots (thickness of wall of aperture 165) being great enough to keep the keys in proper alignment.

Bowed snap rings 175 (FIG. 6) fit in suitable grooves on opposite ends of pin 151 and abut the outside of bracket portion 153 to take up tolerance and axially locate the swivel pin 151 and which may allow some small axial floating thereof, it being possible to increase such floating by use of wave washers as indicated hereinafter in connection with pin 193. This in combination with oversize holes in bracket 155 through which bolts 157 extend permits lateral adjustment at the bracket 155 end of the screw 121 to properly line up and take care of eccentricities, in assembly the screw 121 being assembled first in pin 123. The axial position of screw 121 is fixed with respect to the swivel 151 by snap ring 177 fitting in a suitable groove on screw 121 on the inner side of the swivel 151 and by a spacer collar 179 engaging on one end the outer side of the swivel 151 and on the other a collar 181 fixed in axial position on the screw by a set screw 183 engaging flat 185 on the screw.

The blade 81 is elevated and lowered by a handwheel 187 (FIG. 3) that is located in front of the cabinet 1. The handwheel 187 is mounted on the outside end of elevating screw 189 by means of a non-circular opening and set screw arrangement, or the equivalent, whereby rotation of the handwheel rotates the screw. The screw extends through an opening in the lower part of frame wall 125 and through the interior 131 (FIG. 5) of frame 35 so that its inside end can thread through a tapped bore 191 (FIG. 4) in a swivel pin 193 that is journaled in the bifurcated portion of arbor arm 49 which extends into the frame interior 131 through opening 194 in the top of frame 35. The swivel pin 193 has a turned down hollow or tube end 194 on which is loosely slipped a ring 195. Between the ring 195 and the shoulder 196 of pin 193 is a wave spring washer 197 and on the outer side of the collar 195 is another wave spring washer 198 held against the collar by a plain washer 199 and a snap ring 200 seated in groove 200′ on the tube. With this arrangement the entire pin 193 assembly can be inserted from the left side of the frame as seen in FIG. 4 into legs 49' of the arm 49 through a hole in the frame. A set screw 49a (FIG. 3) bears against collar 195 to hold the pin 193 assembly in the arm; but it will be seen that spring washers 197 and 198 permit axial floating of pin 193 and its tube end 194 relative to the collar and arm. The tube 194 contains a plug 201 of soft, tough material such as nylon which is forced against the threads of screw 189 to press them into the threads of bore 191 to remove play, a spring 203 being compressed against plug 201 by set screw 205. The left side of frame 35 is embossed outwardly at 206 to accommodate the tube and movement thereof and has a suitable opening (not shown) to permit access to the screw 205 and insertion of the swivel pin assembly.

The screw 189 is supported adjacent its front end by a swivel pin 207 (FIG. 3) that is journaled on opposite side walls 209 of a bifurcated front end portion on frame 35, an unthreaded part of the screw 189 extending through a transverse bore 210 in the pin. The swivel pin is axially positioned by snap rings 208 and 208' (FIG. 5), one of which is bowed to permit some axial floating, and the screw is axially positioned with respect to the pin 207 by a snap ring 211 engaged in a groove (not shown) on the screw and abutting one side of the pin, while a collar 213 engages the other side and has a set screw 215 therein engaged in a groove in the screw. The locking means for screw 189 is the same as for screw 121 (FIG. 7) and comprises semi-circular Woodruff keys 219 (FIG. 3) in slots in the screw that open into aperture 221. A rod plunger 223 (FIG. 8) in hole 221 has a tapered end that engages the keys to push them against the wall of bore 210 when it is abutted and moved by the stem 225 of knob 227 that is threaded in the outer end of aperture 221.

Since the elevating screw 189 is carried entirely by frame 35 it will tilt therewith and to accommodate such movement an insert plate 229 (FIGS. 1 and 3) in the front wall 3 of cabinet 1 has an arcuate slot 231 through which the screw extends. In order to indicate the angle of tilt, a pointer 233 is juxtaposed to a scale 235 on the insert 229, the pointer being carried by rod 237 attached to the front of the frame 35 in the hole 239.

The elevating screw is housed almost entirely in the frame 35 where sawdust cannot easily reach it. To protect the threaded end of the tilt screw from sawdust an angle-shaped vertical shield 241 (FIG. 8) is screwed to the right side of the frame 35 forward of the blade 81. An inclined partition 243 (FIG. 3) spanning the full cross section of the cabinet 1 serves as a chute to collect sawdust and chips and deliver them to the open rear side 9 of the cabinet 1.

The frame 35 is rugged enough to carry a motor 245 (FIGS. 2 and 3) that drives pulley belts 247 which run over pulley sheave 79 to rotate arbor 73 and blade 81. The motor mount 249 (FIGS. 2 and 3) includes a bracket 251 that has two rigid rods 253 spaced one above the other which fit in holes 255 in walls 257 and 259 formed in the frame 35. Set screws 261 in the frame 35 engage the rods to fix their position and the distance of bracket 251 from the arbor 73. The bracket 251 has lugs 263 on opposite sides of the bottom edge thereof and pivoted in these lugs, by means of pins 265 which fit in lugs 267 depending therefrom, in a motor base plate 269. The plate 269 and motor attached thereto can automatically pivot fore and aft on pins 265 to accommodate like movement of the pulley 79 as the arbor 73 is elevated by pivoting about the axis of arbor arm hinge 57, thus maintaining a fairly constant tension on the pulley belts. In order to dampen or suitably restrain movement of the motor on pins 265 a bracket 271 is attached by bolt 273 to the front face of plate 269. A pin 275 on bracket 251, over which is placed a plain washer 277 and a spring washer 279, extends through an arcuate slot 281 in the bracket, the bracket being clamped with the desired pressure against the washer 279 by a nut 283 threaded on to the end of pin 275 over washer 284. A rod 285 extends horizontally from the side of bracket 251 and is fixed in position by a set screw 287. The rod carries a slotted vertical bracket 288 which receives screws 289 and nut and washers 290 for clamping in various vertical positions a pulley belt shield 291.

If desired, a motor drive for either or both elevating and tilting may be added to the saw operating mechanism already described, FIGS. 9–11 showing a motor drive for elevation and the same sort of arrangement being capable of use for tilting. The reversible motor 300 for the power drive is conveniently hung on an extension 207a of the swivel pin 207 by means of a bracket 301 cast or secured on the motor, a set screw 303 extending therethrough to be tightened against flat 207b on the swivel pin. The electrical controls for the motor are not shown and may be any suitable sort of switch arrangement for controlling the motor circuit. Secured by set screw 305 on the motor shaft 307 is a toothed or grooved pulley 309 that engages the teeth 310 on the inner periphery of a cog belt 311. The belt 311 runs around the periphery of a large disc 313 and the teeth 310 grip a frictional lining 315 that sets in a peripheral groove 317 of the disc. Thus rotation of the motor 300 will drive belt 311 and rotate disc 313 which is mounted on elevating screw shaft 189.

Disc 313 is mounted on a sleeve 319 but not keyed to it. The sleeve 319 is keyed to the shaft 189 by a set screw 321 through sleeve flange 323 so that the sleeve and shaft rotate together. A yieldable connection between the disc 313 and sleeve 319 is provided which will slip in the event power is applied when the arbor arm 49 has reached the limit of its up or down travel. At the upper limit a rib 324 (FIG. 3) on frame 35 is engaged by a rubber bumper stop 325 which is bonded on a nut 326 that threads on the end of a stud 327 which threads into boss 329, a nut 330 serving to lock the stud in desired position. At the lower limit the boss 70 at the front end of arm 49 engages a rubber bumper stop 331 (FIG. 3) bonded on screw 333 which threads into an opening in the belley 36 of frame 35. The yieldable connection between the sleeve 319 and disc 313 which will slip in the event that the arm 49 is forced too hard against rubber stops 325 or 331 includes radial friction washers 335 secured on the outer faces of the disc 313. Engaged with the friction clutch discs or washers are steel clutch plate washers 337 which have keys 339 formed therein that fit in a longitudinal keyway 341 in the sleeve 319 so that washers 337 rotate with the sleeve. It is evident that if sufficient friction exists between washers 335 and 337 rotation of the disc 313 will be transmitted to sleeve 319 and thence to shaft 189. Pressure is applied to create such friction by nuts 343 that are threaded on the end of sleeve 319 to force disc 313 toward sleeve flange 323 and thus compress wave spring 345 to a desired degree. Thus if Woodruff keys 219 are released and shaft 189 is free to rotate the motor 300 can drive it through a friction clutch arrangement until the arbor arm 49 contacts a stop whereupon the clutch will slip to prevent additional application of torque to the shaft and connected parts. It will also be noted that in the event of excessive torque, slippage may also occur between belt teeth 310 and lining 315 but this cannot be as accurately controlled as can the friction clutch just described by means of control nuts 343.

The screw 189 can also be turned manually by handwheel 187' which has a non-circular hole 345 that fits a corresponding projection 347 on the end of shaft 189 to provide a key connection between the handwheel and shaft. Normally, however, a coil spring 348 confined between sleeve 319 and the end of handwheel hub 349 will just push the handwheel hole 345 off the end of the shaft, set screw 350 being loosened from shaft flats 350a, so that upon rotation of the shaft by the motor it will turn in the hub 349 without turning the handwheel. The handwheel is prevented from working off the shaft 189 by the knob 227, the stem 225 of which threads into the end of shaft 189 to bear upon lock plunger 223 as previously described.

As seen in FIGS. 1–3, the table 19 may be provided with extensions in the form of cast grills or grids 600 that are bolted by bolts 601 to the side faces 603 of the table top. A transverse bar 605 may extend across the backs of the table and extensions and be bolted thereto and at the front a fence bar slide (not shown) or a front bar 607 may be bolted to the front faces of the table and extensions. With this arrangement, the two extensions can be handled as a unit when they are unbolted from faces 603 and the bars 605 and 607 (or fence slide) are unbolted from the rear and front of table 19.

In order to provide a handy place to stow the rip fence (not shown), the splitter assembly, the miter gage, and other parts that may be used with the saw, I provide two hanger brackets 620 (FIGS. 1 and 12), one near the front and one near the rear of the side face of an extension 600 (or of the table 19). The brackets 620 preferably include an angle shaped sheet metal stamping 621, with side flanges to strengthen it, and a sharp-edged notch 623 at the top corner to fit the side face of the table or table extension. The vertical leg 624 of the bracket is slotted at 625 to receive a bolt 627 for attaching it to the side face. The bottom or horizontal leg 629 of the bracket, shown partly in section in FIG. 1, has an opening 631 through which is extended a clip 633, the clip and leg 629 being spot welded together as indicated at 635, the ends of the clip 633 being turned up to form flanges 637 and 639, and one end 641 of the clip overhanging the leg 624 of the bracket to form a hook means for the miter gage, splitter and guard assembly, etc. The fence bar assembly 643 will be easily supported on the two brackets 620 by placing it between legs 624 and flanges 637 as shown in phantom in FIGS. 1 and 12.

What is claimed is:

1. In a tilting arbor wood saw or the like, a tiltable frame, a saw arbor arm pivotally carried by said frame, a screw shaft operatively connected to said frame to tilt it, a screw shaft operatively connected to said arm to pivot it, means for supporting said shafts including a swivel pin through which one of said shafts rotatably extends, said one shaft having a hollow portion therein within said swivel pin, the walls of said hollow portion being slotted on opposite sides and a pair of Woodruff keys being mounted in said slots for radial movement to lockingly engage said swivel pin, and a plunger in said hollow portion operatively connected to said keys to control the radial position thereof.

2. In a tilting arbor saw having a table surface, a saw arbor, movable means supporting said arbor for movement to positions located different distances from said table surface, a screw shaft operatively engaged with said means to move it and position said arbor, means tiltably supporting said shaft including a swivel pin, a motor clamped on to said swivel pin so that its axis is parallel to the axis of the shaft, and drive means between said motor and said shaft including friction clutch means operative at predetermined torque to disconnect the motor and shaft.

3. In a tilting arbor saw having a table surface, a saw arbor, movable means supporting said arbor for movement to positions located different distances from said table surface, a screw shaft operatively engaged with said means to move it and position said arbor, means tiltably supporting said shaft including a swivel pin, a motor clamped on to said swivel pin so that its axis is parallel to the axis of the shaft, drive means between said motor and said shaft including friction clutch means operative at predetermined torque to disconnect the motor and shaft, means providing a handle at the end of said shaft for manual turning, means providing a connection of the handle with the shaft whereby rotation of the handle will rotate the shaft, and spring means acting to move the handle away from said connection so that it is not operatively connected to the shaft.

4. In a tilting arbor saw, a cabinet having four feet adapted to be bolted to a flat surface, said cabinet having an open top with three triangularly disposed support surfaces adjacent said top, a table plate bolted only to said three surfaces, said three surfaces being widely spaced apart and located near the sides of the table plate, a tilt frame supported only on said table plate, an elevating arm carried by said frame adapted to receive a saw arbor, a tilt actuator to tilt said frame and directly supported only by said frame and by said table plate, and an elevating actuator to elevate and lower said arm and directly supported only by said frame, whereby distortions of said cabinet are not transmitted to said actuators.

References Cited in the file of this patent

UNITED STATES PATENTS

| | | |
|---|---|---|
| 103,347 | Lepp | May 24, 1870 |
| 464,568 | Johnson | Dec. 8, 1891 |
| 1,125,364 | Martin | Jan. 19, 1915 |
| 1,381,986 | Gilbert | June 21, 1921 |
| 1,480,588 | Wise et al. | Jan. 15, 1924 |
| 1,788,918 | Klausmeyer | Jan. 13, 1931 |
| 1,900,553 | Hampton | Mar. 7, 1933 |
| 1,985,614 | Merrigan | Dec. 25, 1934 |
| 2,020,222 | Tautz | Nov. 5, 1935 |
| 2,034,353 | Pierson | Mar. 17, 1936 |
| 2,067,652 | Tautz | Jan. 12, 1937 |
| 2,121,069 | Collins | June 21, 1938 |
| 2,142,303 | Crouch | Jan. 3, 1939 |
| 2,163,320 | Hammond | June 20, 1939 |
| 2,167,744 | Cosby et al. | Aug. 1, 1939 |
| 2,168,282 | Tautz | Aug. 1, 1939 |
| 2,208,582 | Hollister | July 23, 1940 |
| 2,261,696 | Ocenasek | Nov. 4, 1941 |
| 2,265,407 | Tautz | Dec. 9, 1941 |
| 2,329,235 | Woodward | Sept. 14, 1943 |
| 2,364,475 | Roemer | Dec. 5, 1944 |
| 2,530,290 | Collins | Nov. 14, 1950 |
| 2,555,217 | Young | May 29, 1951 |
| 2,580,110 | Mabry | Dec. 25, 1951 |
| 2,586,530 | Godfrey | Feb. 19, 1952 |
| 2,593,596 | Olson | Apr. 22, 1952 |
| 2,611,398 | Schutz | Sept. 23, 1952 |
| 2,623,555 | Eschenburg | Dec. 30, 1952 |
| 2,651,530 | Blydenburgh | Sept. 8, 1953 |
| 2,659,220 | Cherry | Nov. 17, 1953 |
| 2,661,777 | Hitchcock | Dec. 8, 1953 |
| 2,690,084 | Van Dam | Sept. 28, 1954 |